United States Patent [19]
Böttinger

[11] Patent Number: 6,131,069
[45] Date of Patent: Oct. 10, 2000

[54] METHOD FOR COMPUTER-AIDED MAPPING

[75] Inventor: Stefan Böttinger, Bielefeld, Germany

[73] Assignee: Claas Selbstfahrende Erntemaschinen GmbH, Harsewinkel, Germany

[21] Appl. No.: 09/159,421

[22] Filed: Sep. 24, 1998

[30] Foreign Application Priority Data

Sep. 26, 1997 [DE] Germany ............... 197 42 463

[51] Int. Cl.[7] .................................. G06F 19/00
[52] U.S. Cl. .................. 702/5; 701/26; 701/50; 701/208
[58] Field of Search .................. 702/5; 701/25, 701/26, 208, 214, 50, 213, 215

[56] References Cited

U.S. PATENT DOCUMENTS

| 5,467,271 | 11/1995 | Abel et al. | 364/420 |
|---|---|---|---|
| 5,477,459 | 12/1995 | Clegg et al. | 701/50 |
| 5,978,723 | 11/1999 | Hale et al. | 701/50 |
| 5,987,383 | 11/1999 | Keller et al. | 701/213 |
| 5,999,878 | 12/1999 | Hanson et al. | 701/208 |

FOREIGN PATENT DOCUMENTS

| 44 23 083 A1 | 1/1995 | Germany | A01B 79/00 |
|---|---|---|---|
| 44 44 367 A1 | 5/1995 | Germany | G01C 21/00 |
| 44 18 659 A1 | 11/1995 | Germany | G01V 9/00 |
| 196 04 812 C1 | 12/1996 | Germany | A01B 69/00 |
| 42 23 585 A1 | 1/1997 | Germany | A01C 15/00 |
| 195 32 870 A1 | 3/1997 | Germany | A01B 69/00 |
| 195 44 112 A1 | 5/1997 | Germany | A01B 69/00 |
| 195 45 704 A1 | 6/1997 | Germany | G01C 21/02 |

*Primary Examiner*—Donald E. McElheny, Jr.
*Attorney, Agent, or Firm*—Husch & Eppenberger, LLC; Robert E. Muir; H. Frederick Rusche

[57] ABSTRACT

A method is provided for computer-aided mapping of geographically referenced measurements which are collected in association with individual measuring positions. The method is checked by computer with test circles for all pairs of adjacent measuring positions, to determine whether further measuring position falls within them. All such measuring positions in which said test criterion is fulfilled are declared as boundary positions. Furthermore, the inner/outer location is determined and the best possible approximation to the boundary path is determined from the sequence of boundary positions.

19 Claims, 6 Drawing Sheets

METHOD FOR COMPUTER-AIDED MAPPING

BACKGROUND OF THE INVENTION

The present invention generally concerns a method for the computer-aided mapping of geographically referenced measurements, in particular agricultural yield quantities, which have been collected in one plot or field along tracks or paths, with a lifting apparatus, e.g. a harvesting apparatus, in association with individual measuring positions. Generally the plot boundary path is approximated by measuring the positions and then allocating the collected measurements to junctions of a coordinate grid proportionately as representative quantities.

As is known in the art, area-related measurement data to be mapped on land which is assigned to the coordinates of individual measuring positions, are in each case collected for one field or plot of land. From this collection, and with the assistance of computer software, a map displaying the distribution of the geographically referenced measurements is produced. An imaginary X-Y coordinate grid is plotted over the area to be mapped and matching representative quantities are assigned to the grid junctions from the measurement data of the adjacent measuring positions. For this purpose, various methods are employed individually or in combination such as averaging, weighted averaging, interpolation or extrapolations or a geostatic method such as the Kriging Method. Proper use of these methods requires the plot boundaries to be known, in each case, to the extent that it is evident whether the individual grid junctions belong to the plot or to an external region. The paths of the plot boundaries may be input into the computer, for example, by being drawn in by hand with a graphic input device. This is a particularly time consuming and frustrating task with large plots. To reduce the required effort, frequently there is recourse to data on paths of the plot boundaries which have already been stored in a data bank. However, the data bank must be updated insofar as agrarian changes have been made to the plot boundaries, e.g. owing to cultivation difficulties such as the impossibility of driving over the ground during tillage or inadequate yield capacity. This too requires great factual and local knowledge of the collecting and inputing cartographer.

In addition, known methods of computer-aided mapping of area-related measurement data is carried out without separate entry of the path of a plot boundary, but rather by approximation thereof via enveloping methods. However, this methodology has resulted in considerable inaccuracies occurring in the outer boundary path. Furthermore, inner boundary paths in regions that cannot be collected are not considered.

It is an object of the invention to provide substantially more accurate and complete determination of the plot boundary paths.

SUMMARY OF THE INVENTION

In accordance with the present invention there is provided a method for the computer-aided mapping of geographically referenced measurements which have been collected via an apparatus in a plot of land along tracks in association with individual measuring positions including the steps of producing an approximation to a plot boundary path from the measuring positions; taking these measuring positions into consideration and allocating the collected measurements to junctions of a coordinate grid proportionately as representative quantities; and for all pairs of adjacent measuring positions, checking the plot boundary path by computer accordingly with test areas adjoining the measuring positions.

Advantageously the test areas are test circles and the checking determines whether no further measuring position falls within them. For all measuring positions in tracks, it is checked accordingly with test areas surrounding the measuring positions whether they in each case do not intersect another track on at least one side. The test areas each comprise test dimensions which are located by a planned tolerance value above a distance between adjacent measuring positions or tracks. All the measuring positions in which the test criterion is fulfilled are declared as boundary positions and their boundary side is determined according to tests. From the sequence of adjacent boundary positions the best possible approximation to the outer and possibly inner boundary path is determined.

The geographically referenced quantity is collected in each case for the whole area of a plot. For example, if the harvest yield is measured, then the whole area of the plot as far as the plot boundary is harvested and in this case along the course of the driving path, for example of the harvester, at the individual points of measurement the yield produced in each case in the last section of the driving path is recorded in allocation to the position coordinates measured there. Similarly during tillage or cultivation of the plot, measurements can be collected along the driving path and assigned to respective points of measurement, wherein the plot is covered by cultivation as a whole.

The course of the respectably adjacent driving path sections are determined from the position coordinates of the measuring positions picked up on the driving path is determined the course of the respectably adjacent driving path sections. From this the distance between them, i.e. the working width is determined. Furthermore, comparison of the distance limit values, upon exceeding a limit value, yields the determination of the driving path sections close to the boundary and hence the best approximation to the boundary path.

This method makes it possible not only to accurately determine an outer boundary path, but by analysis for convergences and divergences of the adjacent driving path sections, also provides the position of inner boundaries of enclosed uncultivated regions.

After determining the best approximation to the plot boundary or boundaries, the measurement data are assigned to the junctions of the coordinate grid, taking into consideration the boundary path and the map output.

This method is perfected when the respective working range of the agricultural machine is collected in each instance according to the distance between the adjacent tracks. The collection of this data is accomplished either by entries by the machine operator or by continuous working width measurement. Thus, the local working width is introduced as a further known variable into the calculation for determining the limit value of distance and the best possible approximation of the plot boundary path.

The limit value of distance, which is used to check whether a track is a boundary track, is slightly greater than the working width so that tolerances of tracking stability do not lead to an erroneous indication of the boundary position when driving over the field along curved paths and during measurement of positions. There is a provision for a tolerance addition of 20% per track, that is, a total of 40% of the individual working width for the two adjacent tracks. Thus when the implement is a combine harvester with a width of 9 m, about 12.5 m can be preset as the limit value of distance. Therefore, if a measuring point is more than 12.5 m from the adjacent track, resulting from the sequence of adjacent measuring point positions, there is a boundary track point.

As the plots do not correspond in width to an integral multiple of a working width, but usually have boundaries running obliquely to each other, the working width on the boundary track is often not fully used. Therefore an advantageous improvement in the method if when picking up the measurements, in particular the yield measurements, the respective local working width is picked up as well and is selected in each case according to the limit values of distance. In particular, it is advantageous to calculate the best approximation of the boundary path to the boundary track points by taking the local working width into consideration.

The accuracy of determining the boundary path is furthered if the location of the position finding device, i.e. the receiving aerial, relative to the position of the working range and the working width on the lifting apparatus is taken into consideration.

This is important both in determining the limit value of distance and in determining the boundary path.

If the aerial or antenna is located eccentrically to the working range of the lifting apparatus, when traveling to and from the area above a plot there is alternately a distance between tracks of the measuring points which is narrowed or widened by double the eccentricity.

Accordingly the limit value of distance for tracks in opposite directions, according to the position of eccentricity relative to the direction of travel, is to be set lower or higher than the working width, which takes into consideration with the tolerance addition. Moreover the calculation of approximation of the boundary path is to be made and improved by taking into consideration the eccentricity in relation to the direction of travel.

Eccentricity of the aerial position relative to the respective working range is advantageously taken into consideration directly when picking up coordinates and measurements by virtue of the fact that the located coordinate values are in each case centered on the respective working range, that is, corrected for the width and position of the working range relative to the aerial, and stored. If correction of the point of measurement is carried out immediately on the spot, separate storage of the position data of the working range is unnecessary when picking up the measurement data, the coordinate values and the working width. The limit value of distance for determining the boundary track position then always follows from half the sum of the working widths of the adjacent stored measurement point tracks plus the tolerance addition. For approximation of the boundary path, half the working width of the stored measuring point track path on the boundary side is to be taken into consideration.

Practical field cultivation with a combine harvester, which is preferably used for picking up measurement data and coordinates, is usually started with one or more circuits, wherein part of the cutting mechanism protrudes beyond the boundary and runs idle there. This is continuously taken into consideration by detecting the position of both the working range and the working width. The last tracks then often run obliquely into the edge zone already harvested, or a narrower working width arises, and the working range is spaced from the edges of the whole cutting mechanism. All these data are measured on the spot and taken into consideration during collection and even when a zone which is incapable of being cultivated is located in this region and adjacent to it, the inner boundary position is detected there by the boundary test.

Instead of checking the limit value of distance between adjacent tracks, alternatively a check of the limit value of distance of measuring point coordinates collected in any sequence is made by checking, for all pairs of adjacent points, whether these traversing test circles in each case include at least one additional measuring point. If not, there are only two boundary points and the respective test circle is located on the boundary side. The dimension of the test circle radius is again determined by the usual distance between measuring points which roughly corresponds to the working width described above. It is further assumed that the distance between measuring points in the different directions is similar. Otherwise the tolerance addition must be reasonably selected or a suitable test area shape, e.g. an ellipse, whose axis lengths in each case conform to the distances between the measuring points in both directions plus a tolerance addition, must be selected. Furthermore, the axes of the point arrangement must be oriented accordingly. The distance between the measuring points during collection usually depends on the speed of travel, as the coordinate signals are in each case transmitted in a fixed time cycle.

As the checks of distance between points or tracks also define the inner or outer boundaries of those regions for which no coordinate values could be stored for technical reasons, e.g. reception, it is provided that corresponding markers can be stored by the operator or automatically during data collection. Alternatively, an interim report on the determination of such collection islands can be issued and a decision on inclusion or exclusion of the region in further allocation procedures can be requested from the operator.

The description of the computer checking operation by means of the test areas, test circles or test ellipses serves as an illustration. However, circle equations or ellipse equations do not have to be used. The distances between the adjacent points can also be calculated and checked with circle or triangle functions.

BRIEF DESCRIPTION OF THE DRAWINGS

Reference is now made to the drawings which illustrate the best known mode of carrying out the invention and which show a system and examples for putting the method into practice.

DETAILED DESCRIPTION

Figure 1:
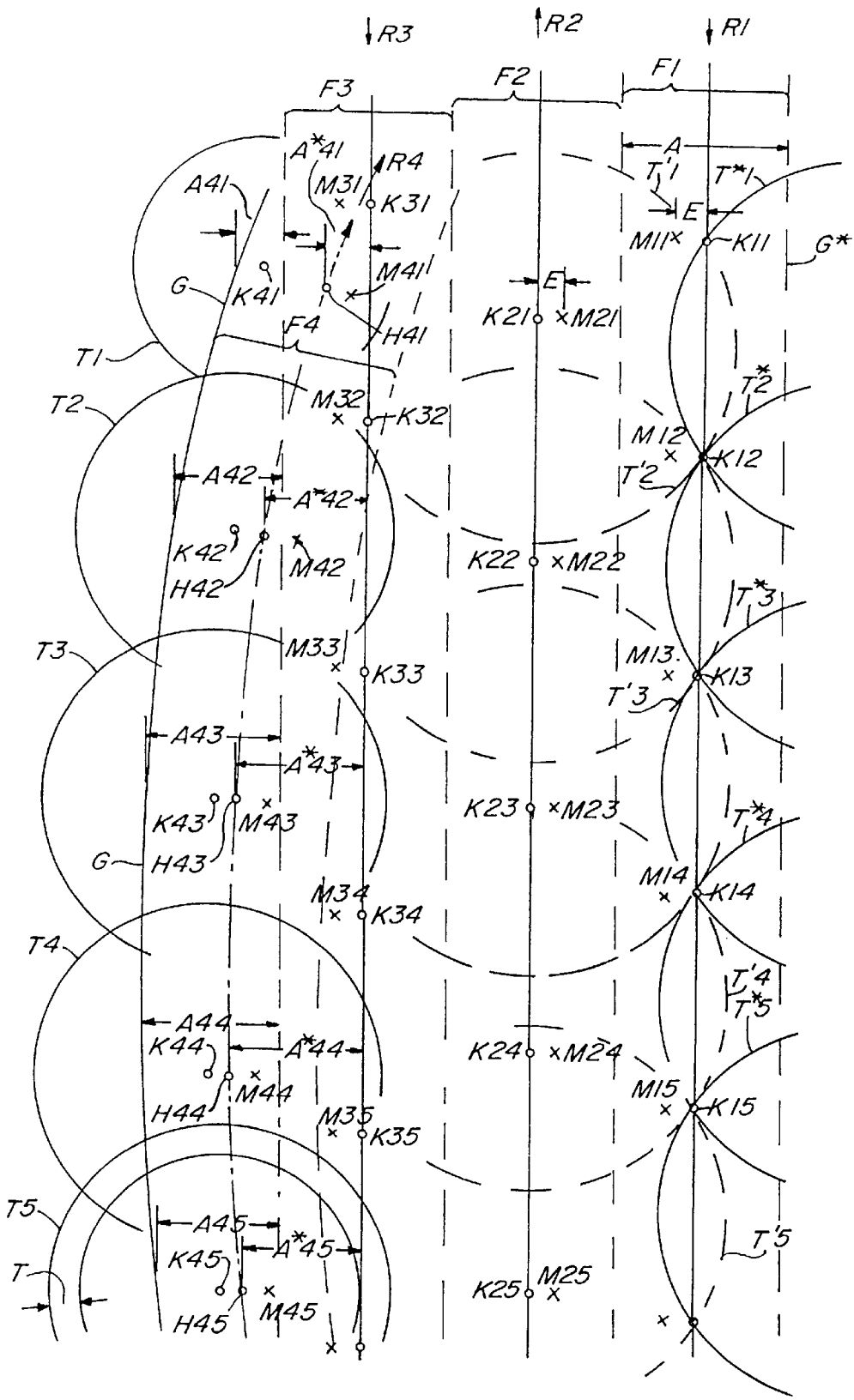
FIG. 1 shows a region of a plot close to a boundary.

FIG. 1 shows tracks or paths F1–F4 in the region close to a boundary. The tracks F1–F3 are relatively straight and track F4 is curved. Adjacent tracks each have opposite directions of travel R1–R4. Measuring points M11–M15; M41–M45 are drawn at the actual position finding points.

As indicated at the top center of FIG. 1, the aerial or antenna on the collection machine has an eccentric position E relative to the center axis of the machine. Because of this eccentricity, the stored position coordinates K11–K15; K31–K35 are advantageously corrected to the machine center and the full working width A has been used in the tracks remote from the boundary F1–F3.

The track F4 located on the boundary side has a variable, local working width A41–A45. Track F4 is not aligned with tracks F1–F3 and one may say that it is located eccentrically. This is because the collection machine has traversed the residual strip along the boundary G. Here the stored position coordinates K41–K45 are stored with reference to the center of the actual working range. Whether there is a boundary position is determined from the stored position coordinates K41–K45, taking into consideration the halved associated stored local working width A41–A45 and half the maximum working width A, as well as a tolerance addition T. Accordingly test circles T1–T5 are drawn around the stored position coordinates K41–K45, which intersect an adjacent track F3 on only one side, thereby indicating the boundary position thereof relative to the other side.

The approximated boundary path G is determined by a suitable algorithm, such as a Graham enveloping algorithm, or a quick enveloping method, based upon the stored boundary position coordinates K41–K45, which always have tolerances, and the halved associated stored local working width A41–A45.

Determination of the local working width A41–A45 is carried out either automatically on the spot via a signal of a crop boundary sensor on the collection machine (which often also serves as a means for automatic steering of the machine and/or for regulating throughput), or by continuous entry by an operator in case of variations. Preferably, apart from the working width, the position of the respective working range within the track or path is determined continuously. It is particularly easy to take this position information into account for further processing if the position of the measured coordinates is stored in a corrected form and centered on the position of the working range. The correction is made perpendicular, i.e. at a right angle, to the respective direction of travel. Therefore storage of an additional quantity is unnecessary. Alternatively, if the working width A41–A45 cannot be detected, it is calculated from the convergence of the adjacent tracks. Then the auxiliary position coordinates H41–H45 are stored and centered on the full working width.

The distance A*41–A*45 between the auxiliary position coordinates of the adjacent track F3 is in each case calculated. It corresponds to the local working width A41–A45 within the scope of measurement and computer tolerances. The best-approximated boundary path G is accordingly to be determined by half the maximum working width A in addition to the sequence of boundary auxiliary position coordinates H41–H45.

Another method for determining boundary position coordinates K11–K15 is illustrated by the test circles T*1–T*5; T'1–T'5. These test circles each intersect two adjacent point coordinates. The outer test circle is empty and thus shows the boundary position of the points and the side of the path of the boundary G*. If the measuring points are collected in order of the track each corresponds to, test circle checking can be used in practice from one pair of points to the next so the test circle can roll over the points. If sufficient proximity has been determined on one side of a track when passing through the adjacent track, it is sufficient to per form the test on the other side.

After the best possible approximation of the boundary path has been obtained, the collected measurements can be allocated by an equalizing method to the actual plot areas, which lie within the boundary on the boundary side, as a function of the area proportions in th e coordinate grid.

Figure 2:
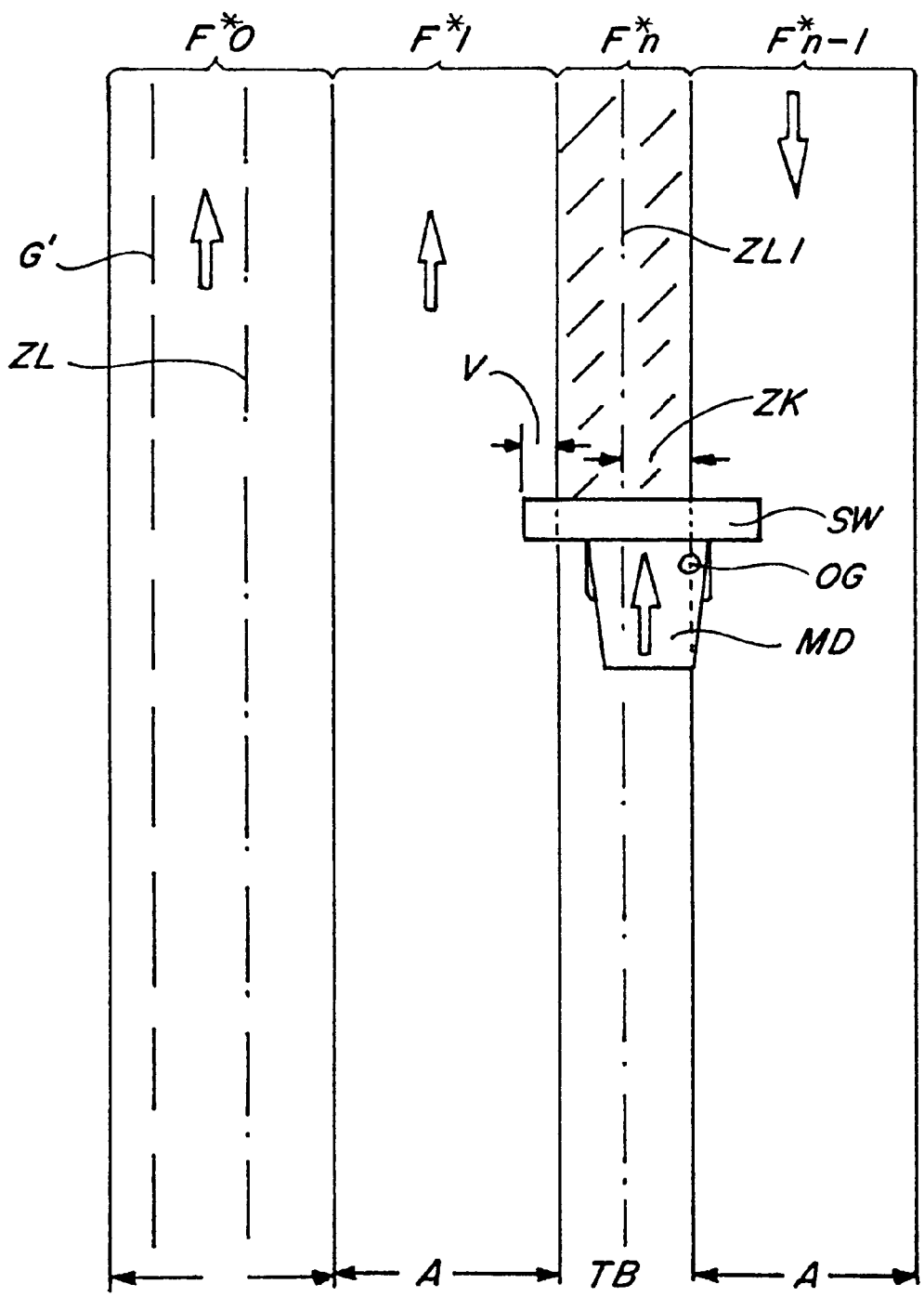
FIG. 2 shows a further region with tracks or paths.

FIG. 2 shows another example of tracks F*O–F*n in the vicinity of a plot boundary G', which starts in the combine harvester MD during collection. The initial track or path F*O exceeds the boundary G' and has only a partial working width. The measured position coordinates are therefore stored in a form converted to the center line ZL of the working range actually used. After another track F*1 has been made completely around the plot on the boundary side, additional tracks are then made in alternate directions in the usual manner. The penultimate track F*n–1 still has the full working width A and the last track F*n has only a partial working width TB. The latter is laterally offset a distance V from the side edge of the cutting mechanism SW. Therefore the measuring points are recorded and are offset from the true position of the center of the position finding device OG, by a central correction value ZK, toward the imaginary centering line central to the true working range. Further, the local partial working width TB and the collected measurement are recorded as well.

Figure 3:
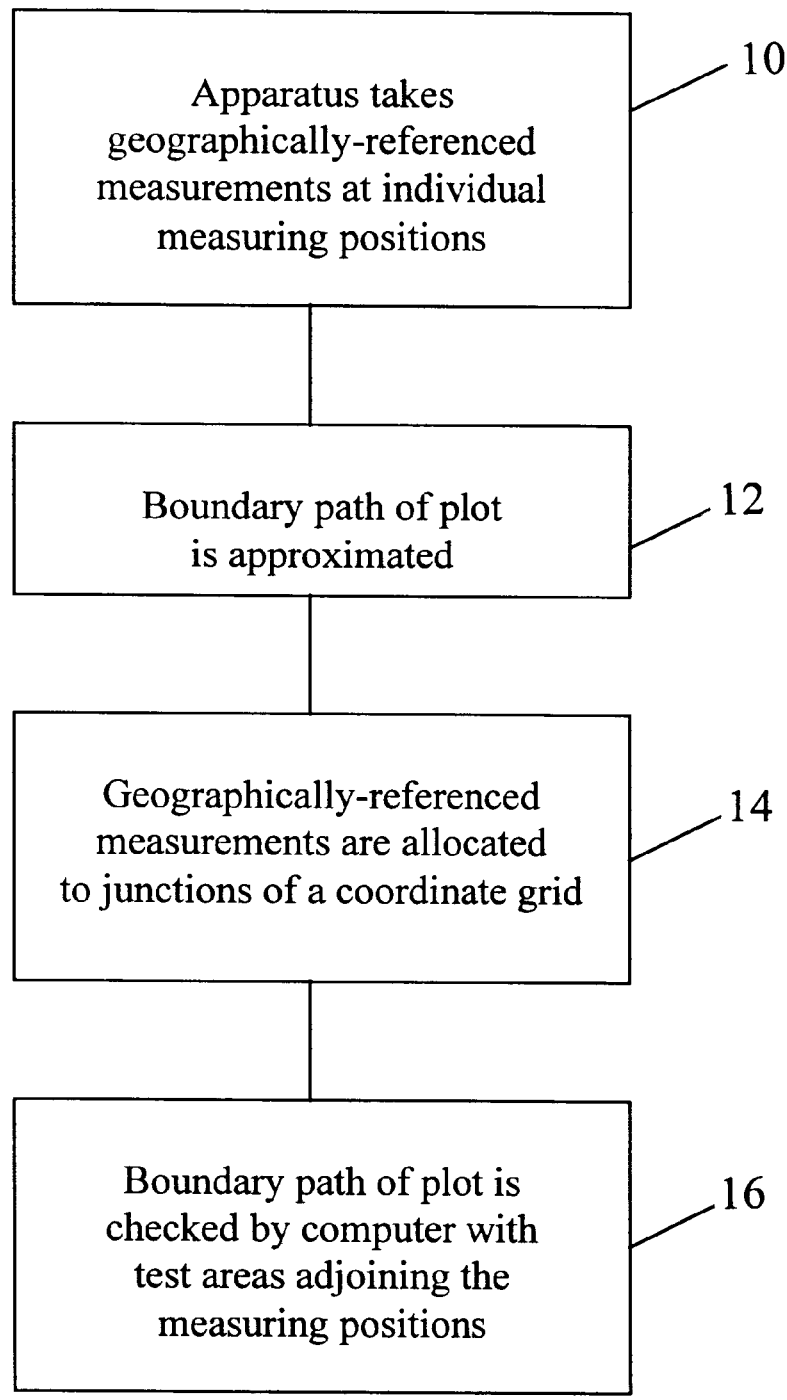
FIG. 3 is a flow chart showing the basic steps involved in a method for computer-aided mapping.

FIG. 3 is a simplified flow chart of the basic steps of the method. An apparatus, in particular, a harvesting apparatus, collects geographically-referenced measurements at individual measuring positions, shown as step 10. The boundary path of the plot is then approximated, step 12. Next, the geographically-referenced measurements are allocated to junctions of a coordinate grid proportionately as representative quantities, step 14. The boundary path of the plot is checked by a computer with test areas adjoining the measuring positions, step 16.

Figure 4:
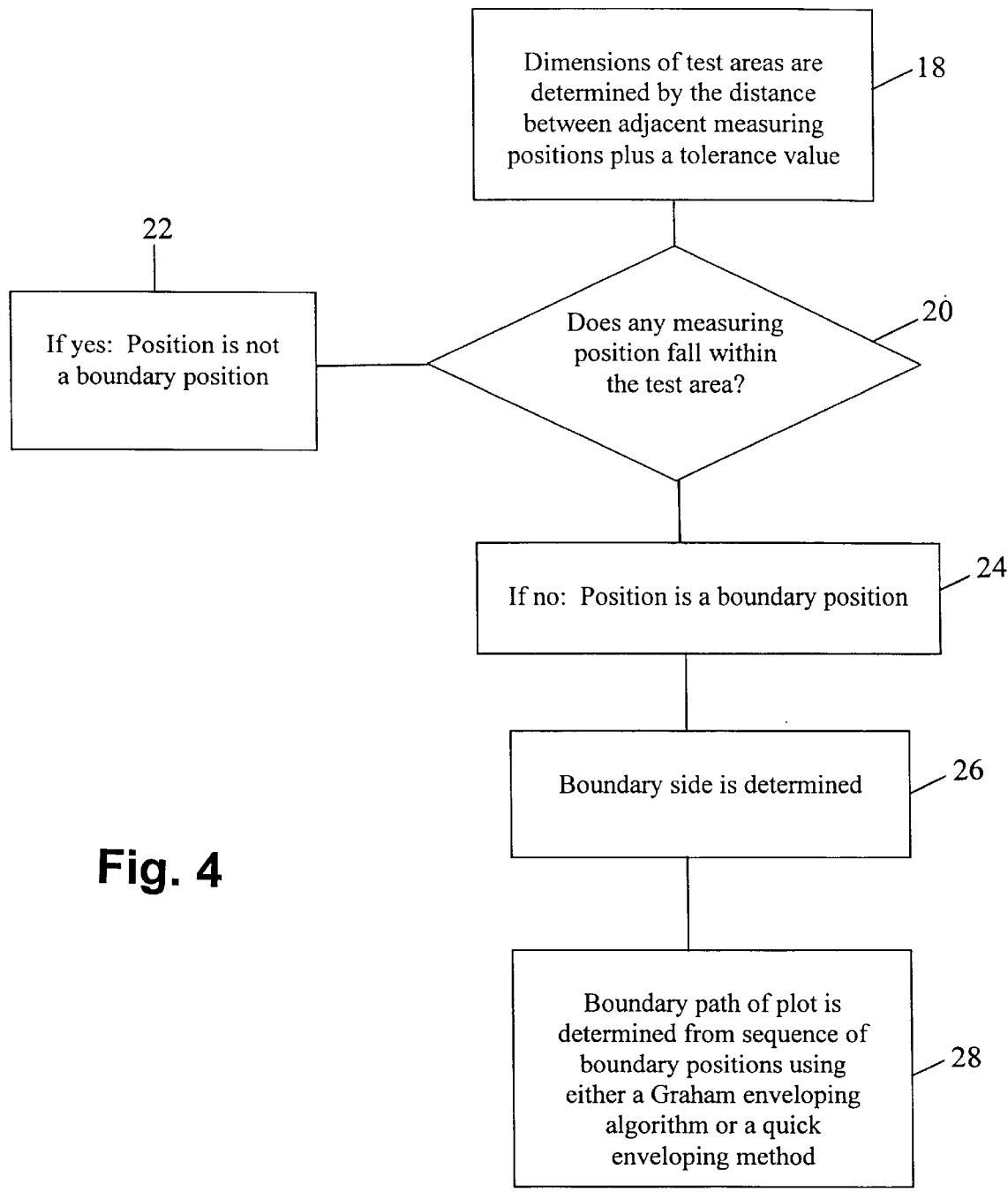
FIG. 4 is a flow chart showing a method of determining the test dimension for the test areas used in the method for computer-aided mapping.

FIG. 4 illustrates one method for checking the boundary path of the plot by computer with test areas. First, the dimensions of the test areas are determined by the distance between adjacent measuring positions plus a tolerance value, shown as step 18. Then the test criterion is examined to determine whether there is a boundary position or not, step 20. If the criterion is not satisfied, there is no boundary position, step 22. However, if the criterion is satisfied, there is a boundary position, step 24. After the boundary positions have been determined, the boundary side is determined, step 26, and the boundary path of the plot is determined from the sequence of boundary positions using either a Graham enveloping algorithm or a quick enveloping method, step 28.

Figure 5:
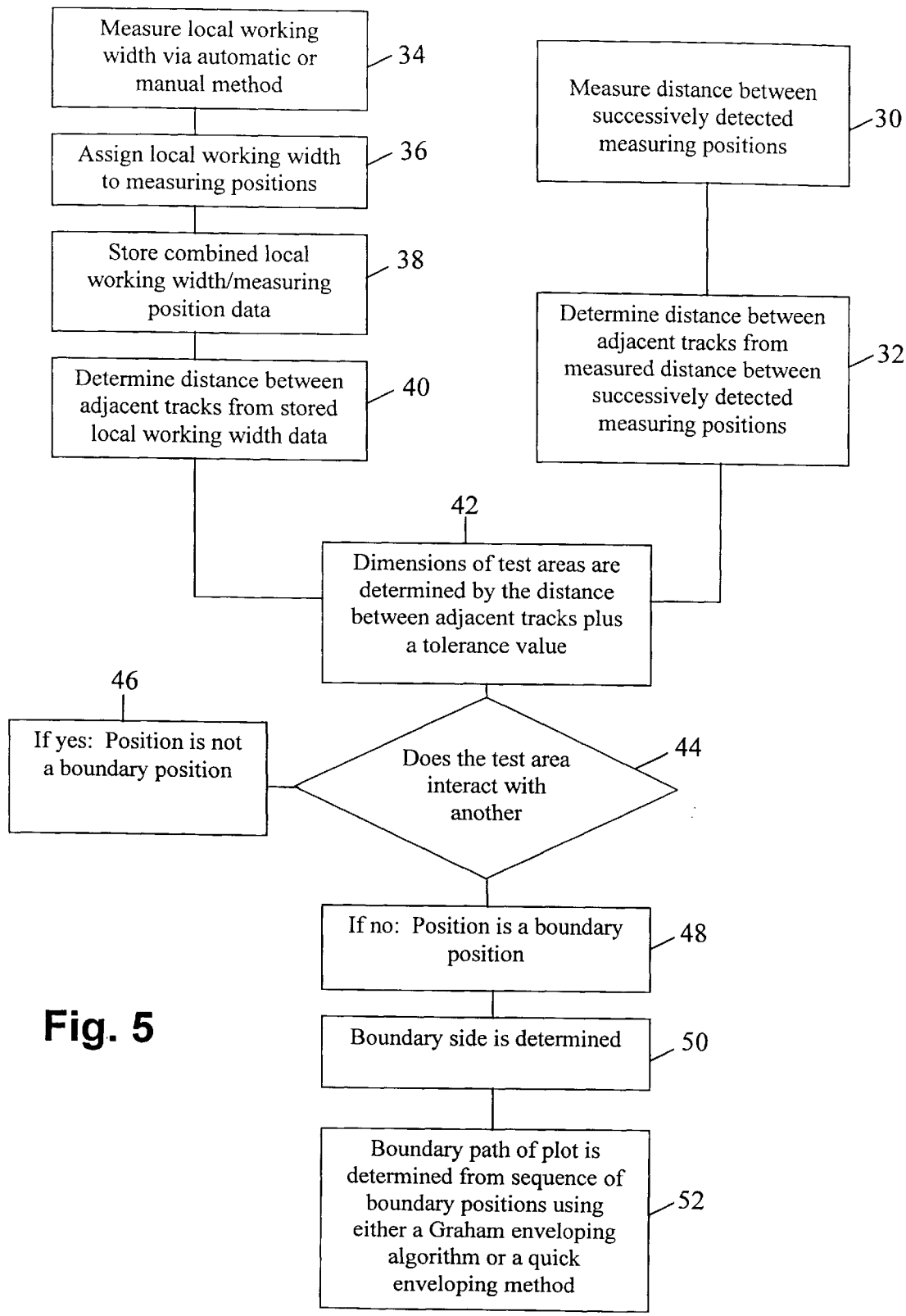
FIG. 5 is a flow chart showing another method of determining the test dimension for the test areas used in the method for computer-aided mapping.

FIG. 5 is a flow chart for another method for checking the boundary path of the plot by computer with test areas. In this method, the dimensions of the test areas are determined by the distance between adjacent tracks plus a tolerance value, shown as step 42. There are two alternatives provided to find the distance between adjacent tracks. The distance between successively detected measuring positions, steps 30 and 32, or the local working width, steps 34–40, can be measured and used. Once the dimensions of the test areas are found, the method shown in FIG. 5 progresses in the same manner as that shown in FIG. 4.

Figure 6:
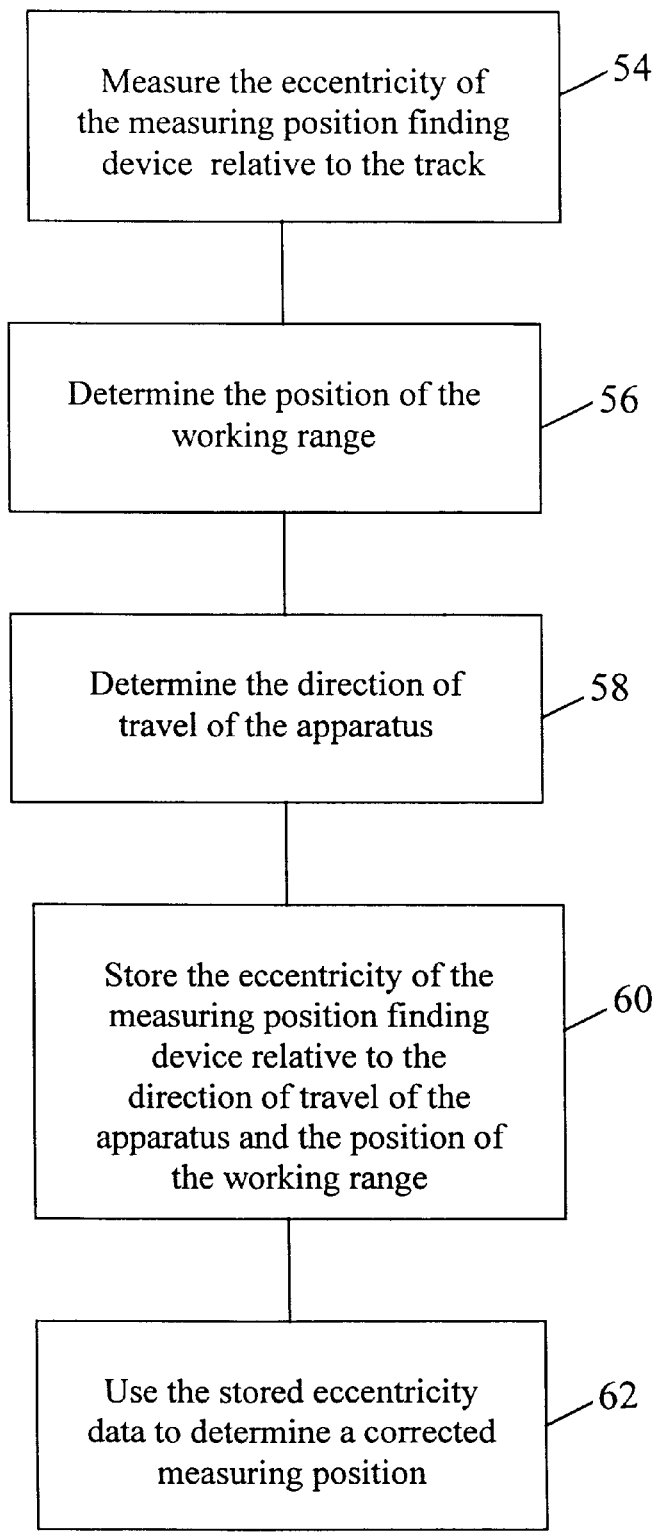
FIG. 6 is a flow chart showing a method of producing a corrected measurement position.

FIG. 6 illustrates how a corrected measuring position can be obtained, step 62, by measuring and storing the eccentricity of the measuring position finding device, step 54, position of the working range, step 56, and the direction of travel of the apparatus, step 58.

Other objects, features and advantages will be apparent to those skilled in the art. While preferred methods of carrying out the present invention have been illustrated and described, this has been by way of illustration and the invention should not be limited except as required by the scope of the appended claims.

I claim:

1. A method for the computer-aided mapping of geographically referenced measurements which have been collected via an apparatus in a plot of land along tracks in association with individual measuring positions including the steps of: producing an approximation to a plot boundary path from the measuring positions; taking these measuring positions into consideration and allocating the collected measurements to junctions of a coordinate grid proportionately as representative quantities; and for all pairs of adjacent measuring positions, checking the plot boundary path by computer accordingly with test areas adjoining the measuring positions.

2. A method according to claim 1, including utilizing agricultural yield quantities as said geographically referenced measurements.

3. A method according to claim 1, including utilizing a harvesting apparatus as said apparatus.

4. A method according to claim 1, including utilizing test circles as said measuring positions, which test circles are exclusive of any further measuring positions falling within the test circles.

5. A method according to claim 1, wherein said measuring positions are in tracks, and the step of checking the plot boundary path by computer accordingly with test areas includes utilizing test areas surrounding the measuring positions.

6. A method according to claim 4, wherein said test circles, whether they in each case do not intersect with another track on at least one side, comprise test dimensions which are located by a planned tolerance value above a distance between adjacent measuring positions; and including the steps of declaring all the measuring positions in which a test criterion is fulfilled as boundary positions, determining their boundary side according to tests, and approximating the plot boundary paths from the sequence of adjacent boundary positions.

7. A method according to claim 6, including utilizing a test radius as said test dimensions.

8. A method according to claim 6, including locating said test dimensions by a planned tolerance value above a distance between adjacent tracks.

9. A method according to claim 1, including determining a predetermined test radius for checking the distance between respectively adjacent tracks from a working width of the apparatus plus the tolerance addition.

10. A method according to claim 1, including determining a predetermined test radius for checking the distance between respectively adjacent tracks from the distance between successively detected measuring positions plus the tolerance addition.

11. A method according to claim 1, including continually measuring a local working width, assigning the same to said measuring positions, and storing the data; and determining the local test radius from these stored local working widths.

12. A method according to claim 1, including manually inputting a local working width at an operator station of the apparatus, assigning the same to said measuring positions, and storing the data; and determining the local test radius from these stored local working widths.

13. A method according to claim 9, including determining the best possible approximation of the plot boundary path along the tracks located on the boundary side, taking into consideration said local working width.

14. A method according to claim 1, including predetermining the best possible approximation of the test radius in such a way that a position of the measuring position finding device, which is eccentric relative to the track on the apparatus of the respectively adjacent tracks and their orientation relative to each other, is taken into consideration locally.

15. A method according to claim 14, including storing the respectively measured measuring positions in a corrected form by taking into consideration the position of the measuring position finding device, which is eccentric relative to the track on the apparatus, and storing the information in each case depending on direction as a corrected measuring position.

16. A method according to claim 14, including storing and evaluating said position of the measuring position finding device in relation to the respective position of a working range.

17. A method according to claim 14, including centering said respectively measured measuring positions on the position of the respective working range, and storing and evaluating the data.

18. A method according to claim 1, including determining the best possible approximation of the plot boundary path by a Graham enveloping algorithm, with the position coordinates located on the boundary side and the respective working width.

19. A method according to claim 1, including determining the best possible approximation of the plot boundary path by a quick enveloping method, with the position coordinates located on the boundary side and the respective working width.

* * * * *